(12) United States Patent
Tages

(10) Patent No.: US 8,733,603 B2
(45) Date of Patent: May 27, 2014

(54) MOBILE DEVICE MOUNTING EXCHANGE SYSTEM AND METHOD

(75) Inventor: Fernando J. Tages, Coral Springs, FL (US)

(73) Assignee: A.G. Findings & Mfg. Co., Sunrise, FL (US)

(*) Notice: Subject to any disclaimer, the term of this patent is extended or adjusted under 35 U.S.C. 154(b) by 354 days.

(21) Appl. No.: 12/985,535

(22) Filed: Jan. 6, 2011

(65) Prior Publication Data
US 2011/0163214 A1 Jul. 7, 2011

Related U.S. Application Data

(60) Provisional application No. 61/292,675, filed on Jan. 6, 2010.

(51) Int. Cl.
*H04M 1/04* (2006.01)

(52) U.S. Cl.
USPC .... 224/271; 224/666; 455/575.6; 248/223.41

(58) Field of Classification Search
USPC ............... 248/223.41, 222.11, 222.13, 24.7, 248/309.1, 311.2, 316.1, 316.72, 220.21, 248/220.22, 221.11, 224.7, 316.7; 224/197, 224/269, 271, 660, 663, 191, 666; 24/3.11, 24/3.12; 455/575.1, 575.6

See application file for complete search history.

(56) References Cited

U.S. PATENT DOCUMENTS

| 5,014,892 | A  | * | 5/1991  | Copeland ..................... 224/271 |
|-----------|----|---|---------|--------------------------------------|
| 5,370,570 | A  | * | 12/1994 | Harris ............................ 24/486 |
| 5,702,081 | A  | * | 12/1997 | Gallemore, II ............ 248/218.4 |
| 5,833,189 | A  | * | 11/1998 | Rossman et al. ......... 248/231.61 |
| 6,283,348 | B1 | * | 9/2001  | Wang ............................. 224/271 |
| 6,637,707 | B1 | * | 10/2003 | Gates et al. ............... 248/224.7 |
| 7,162,281 | B2 | * | 1/2007  | Kim ............................ 224/197 |
| 7,409,237 | B2 | * | 8/2008  | Tages ......................... 455/575.1 |
| 2011/0163214 | A1 | * | 7/2011 | Tages ....................... 248/220.21 |

* cited by examiner

*Primary Examiner* — Tan Le
(74) *Attorney, Agent, or Firm* — Christopher & Weisberg, P.A.

(57) ABSTRACT

An attachment assembly for a mobile device case is included. The attachment assembly includes a lock engagement element. A lock assembly is also included, the lock assembly being retainably insertable within the lock engagement element. A base having an opening there through is also included, the base being mountable to the mobile device case. The lock engagement element and the lock assembly cooperate to slideably and releasably affix the lock engagement element to the base within the opening.

10 Claims, 5 Drawing Sheets

MOBILE DEVICE MOUNTING EXCHANGE SYSTEM AND METHOD

CROSS-REFERENCE TO RELATED APPLICATION

This application is related to and claims priority to U.S. Provisional Patent Application Ser. No: 61/292,675, filed Jan. 6, 2010, entitled MOBILE DEVICE MOUNTING EXCHANGE SYSTEM AND METHOD, the entirety of which is incorporated herein by reference.

STATEMENT REGARDING FEDERALLY SPONSORED RESEARCH OR DEVELOPMENT n/a

FIELD OF THE INVENTION

The present invention relates to portable electronic device accessories and more specifically to affixation accessories for mobile devices.

BACKGROUND OF THE INVENTION

Recent statistics show that the number of cellular telephone users in the United States alone is about 203 million. The emergence of the cellular telephone and portable digital assistants ("PDA"s) as widely embraced technologies has led to the emergence of ancillary markets, such as the market for cellular telephone accessories. As more and varied cellular accessories reach the market, the need for smaller, more streamlined, and more flexible accessories has developed.

Cellular telephones are currently quite compact, having a length, width and depth of only a few inches. Some persons, particularly males, prefer to carry their cellular telephone or cell phone on a belt about their waist. Various belt clips for cellular telephones have been devised. One form of belt clip requires that the cell phone itself carry a certain attachment that interlocks with a complementary attachment on the belt clip. These types of cellular telephone belt clips include a first clip member, which captures the person's belt and a complementary clip member which interacts with the first clip member permanently or semi-permanently attached to the rear side of the cell phone or cell phone case. This form of belt clip, however, can be complicated to use since it consist of multiple separate pieces and the user is required to place a first member on his belt before the cell phone is attached to the belt.

Another form of belt clip is a simple clip that attaches permanently or semi-permanently to the back of the cell phone or cell phone case. The clip is subsequently attached to a belt or a pant edge. These clips, however, can be bulky and unwieldy to use. Further, the cumbersome nature and size of these clips makes it more difficult to carry the cell phone in a pant pocket or a small purse.

Further, belt clips and cases are typically provided with a fixed clip or a clip designed to be used with a single case. This arrangement is inefficient and necessitates the use of multiple mobile device cases for a single device in different carrying scenarios. For example, a user might have a case with belt clip to affix the device to a belt, and another case with a hook to affix the device to a strap and yet another case with no clip or hook when the device is going to be carried in a purse or pocket.

Thus, there is a need to overcome the problems with the prior art, and more particularly for a more efficient and compact way to provide an interchangeable clip or other fastener arrangement to affix a mobile device to different objects.

SUMMARY OF THE INVENTION

The present invention advantageously provides a method and system for affixing an attachment assembly to a mobile device case. The attachment assembly includes a lock engagement element. A lock assembly is also included, the lock assembly being retainably insertable within the lock engagement element. A base having an opening there through is also included, the base being mountable to the mobile device case. The lock engagement element and the lock assembly cooperate to slideably and releasably affix the lock engagement element to the base within the opening.

In another embodiment, the method includes retainably inserting a lock assembly within a portion of a lock engagement element, the lock assembly is affixed to the clip attachment element. A base is slideably and retainably inserted within a portion of the lock engagement element. The lock assembly retains the base to the lock engagement element. The base is affixed to the mobile device.

In yet another embodiment, the attachment assembly includes a lock engagement element and a pair of indentations defined by the lock engagement element, the pair of indentations being defined on opposite sides of the lock engagement element. A lock assembly depressably insertable within the lock engagement element is also included. A base having an opening there through is included, the base being mountable to the mobile device case. A pair of flaps included on the base and extending towards the center of the opening is included, the flaps being slideably engageable to the pair of indentations. The lock assembly and the lock engagement element cooperate to slideably and retainably affix the base to the lock engagement element by securing the flaps within the indentations.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
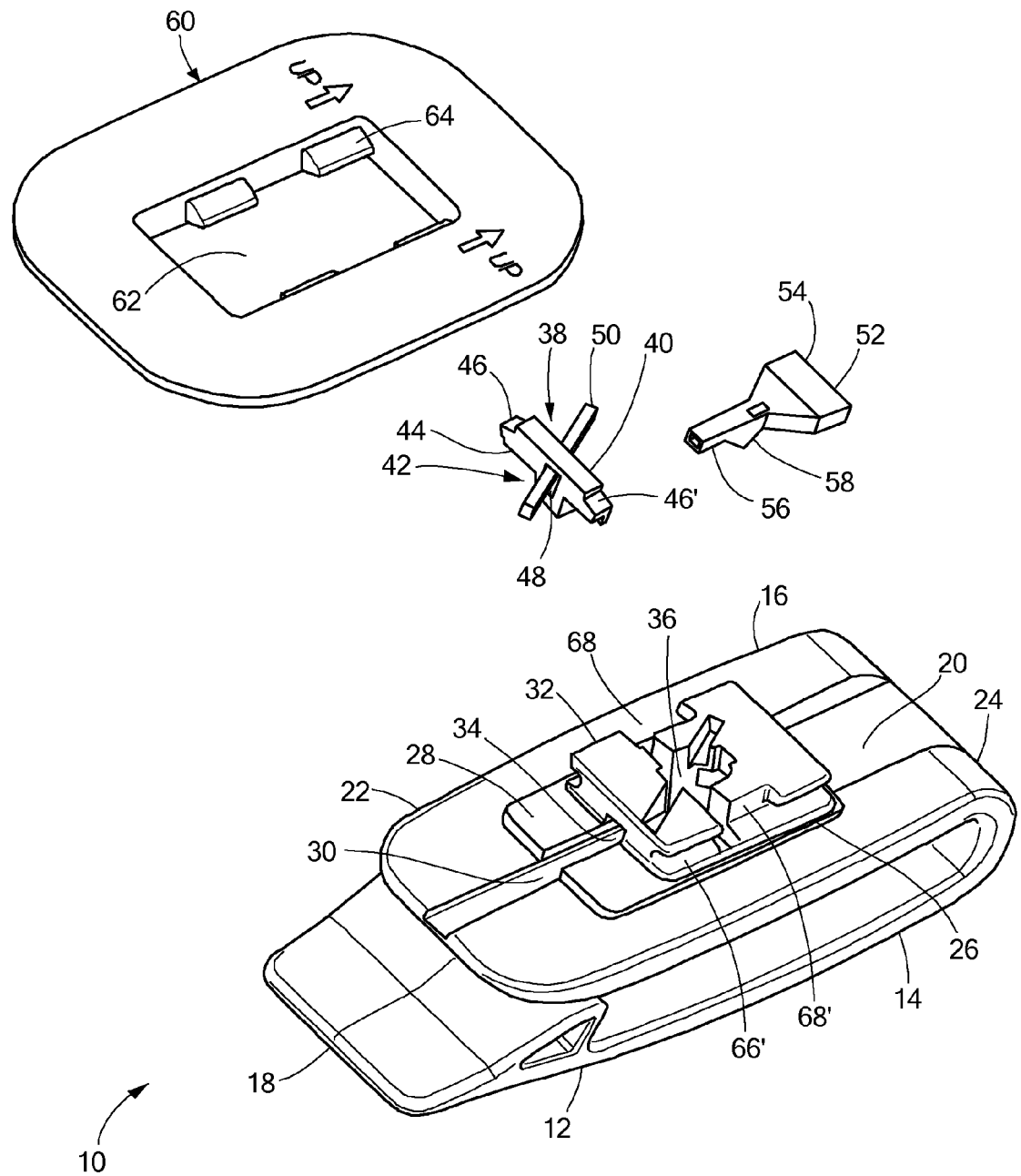
FIG. 1 is an exploded view of an exemplary embodiment of an exchangeable mobile device mounting system constructed in accordance with the principles of the present invention.

Now referring to the drawing figures, wherein in like reference designators refer to like elements, there is shown an embodiment of an exchangeable mobile device mounting system for affixing a portable device to an object in accordance with the principles of the present invention and generally designated as "10." The system 10 may include a clip arm attachment 12 that removably affixes the system 10 to a waist belt, hand bag, or other desired locations on a user. For example, the clip arm attachment 12 may be a fastener that clips to the belt loops on a user's pants. It is further contemplated that any clip arm attachment 12, of any dimension and configuration, may be used with system 10. For example, the clip arm attachment 12 may be a swivel post (FIG. 5) discussed in more detail below.

In an exemplary embodiment, the clip arm attachment 12 defines a first portion 14 and a second portion 16, the first portion 14 having a larger length the second portion 16. When the second portion 16 is relaxed in its biased state, it forms a substantially closed loop with the first portion 14. When the first portion 14 engages, for example, a belt loop, the second portion 16 may be flexed by a user about the first portion 16, by an application of force, to allow the first portion 14 to a belt loop. Upon cessation of the force, the second portion 16 returns to its biased state to fasten the clip arm attachment 12 to a user's belt loop.

The first portion 14 may further define a tab 18 extending beyond the second portion 16 that facilitates a user's application of force to the second portion 16. The second portion 16 may define a channel 20 along its surface, the channel 20 extending the entire length of the second portion 16. The channel 20 may define a larger width at a first end portion 22 of the second portion 16 and a narrower width at a second end portion 24 of the second portion 16.

The system 10 also includes a clip arm 26, which facilitates the engagement of the clip arm attachment 12 to other components of the system 10, for example, a mobile device. In an exemplary embodiment shown in FIG. 1, the clip arm 26 is immovably affixed to the clip arm attachment 12. The clip arm 26 may further include a post 28 that is affixed to the second portion 16. The post 28 may be substantially rectangular in shape, or any shape, and further defines a slit 30 along its mid portion. The slit 30 may define a larger width at one end portion of the post 28 and a narrower width at the opposite end portion. When affixed to the clip arm attachment 12, the post 28 is positioned such that the wider portion of channel 20 is substantially coincident with the wider portion of slit 30 and the narrower portion of channel 20 is substantially coincident with the narrower portion of slit 30. The clip arm 26 and the clip arm attachment 12 may further be molded together as a single unit.

Continuing to refer to FIG. 1, the clip arm 26 further includes a lock engagement element 32 affixed on top of the post 28. The lock engagement element 32 may be substantially I-shaped, or any shape, to accommodate the various components engageable or receivable within or about it. For example, the lock engagement element 32 may define a recess 34 along its mid portion. The recess 34 may define a larger width at one end portion of lock engagement element 32 and a narrower width at the opposite end portion. When affixed to the post 28, the lock engagement element 32 is positioned such that the wider portion of recess 34 is substantially coincident with the wider portion of slit 30 and the narrower portion of recess 34 is substantially coincident with the narrower portion of slit 30.

Figure 2:
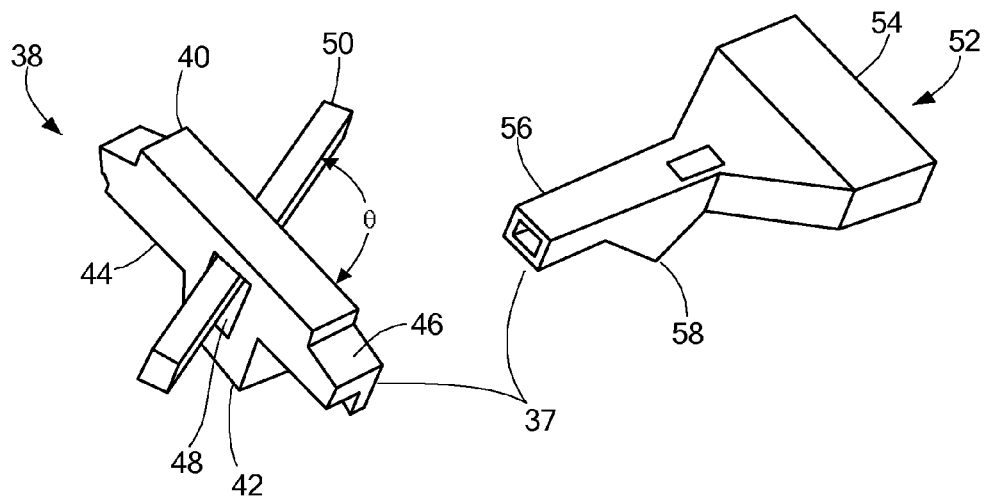
FIG. 2 is a perspective view of the lock assembly of an exchangeable mobile device mounting system shown in FIG. 1, including the lock and release tab.

The lock engagement element 32 may further define a lock assembly receptacle 36 sized to receive and fit a lock assembly 37 of similar size and dimension. In an exemplary embodiment shown in FIG. 2, the lock assembly 37 includes a lock 38, which is composed of a flexible material such acetal, The lock 38 includes a first section 40 sized to span the width of the lock assembly receptacle 36 and the lock engagement element 32. The first section 40 may be substantially T-shaped, or any shape, and include a substantially rectangular portion 42 and a longitudinal section 44 sized to fit within the transverse section of the lock assembly receptacle 36. The longitudinal section 44 may define flared edges 46 and 46' (collective flared edges 46) that are smaller in height than the height of the longitudinal section 44 and extend beyond the length of the longitudinal section 44. The first section 40 may further define an aperture 48 at its mid section, the aperture 48 being sized such that it may be larger on one side of the first portion and smaller on the opposite side. The lock 38 may further include a second portion 50 affixed to the first section 40. The second section 50, which may be substantially rectangular in shape, may be affixed to the first section 40 and intersect it at an angle. For example, as shown in FIG. 2, the second section 50 intersects the longitudinal section 44 at an obtuse angle theta ($\theta$) of approximately 120°. A portion of lock assembly receptacle 36 is complementarily sized to receive the second section 50. In an exemplary embodiment, the lock 38 may be pressed within the lock assembly receptacle 36.

Continuing to refer to FIG. 2, the lock assembly 37 may further include a release tab 52, which is generally flexible and slideably received within the lock engagement element 32 and the aperture 48 of the lock 38. The lock assembly receptacle 36 may further be defined to accommodate the slidable insertion of the release tab 52 within the lock engagement element 32. The release tab 52 may include a first part 54, which in the exemplary embodiment shown in FIG. 1 is shaped like an irregular pentagon. Extending from the first part 54 is a second part 56, the second section is sized to extend through the aperture 48. The second part 56 further includes a ridge 58 engageable with the first section 40. In an exemplary operation, the release tab 52 is slideably received within the lock engagement element 32 and within the lock 38. As the release tab 52 is inserted within the lock 38, the ridge 58 passes through the larger portion of aperture 40 and permanently locks the release tab 52 with the lock 38. The release tab 52 may further operate to secure the lock 38 to the lock engagement element 32. In an exemplary embodiment, when the lock 38 and the release tab 52 are secured within the lock assembly receptacle 36, the first part 54 partially extends beyond the lock engagement element 32 into a portion of the channel 20.

Figure 5:
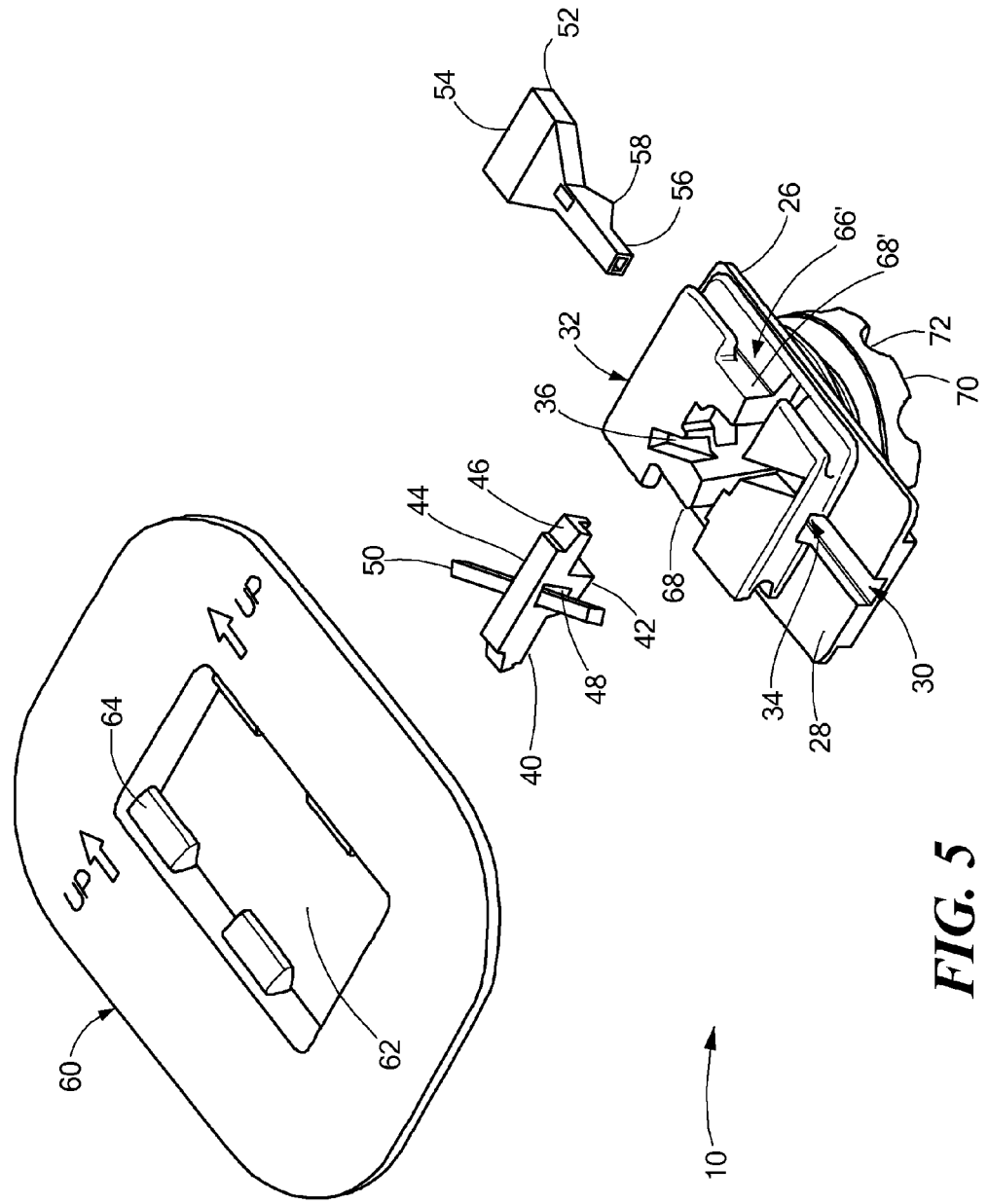
FIG. 5 is an exploded view of an another embodiment of the exchangeable mobile device mounting system.
Figure 6:
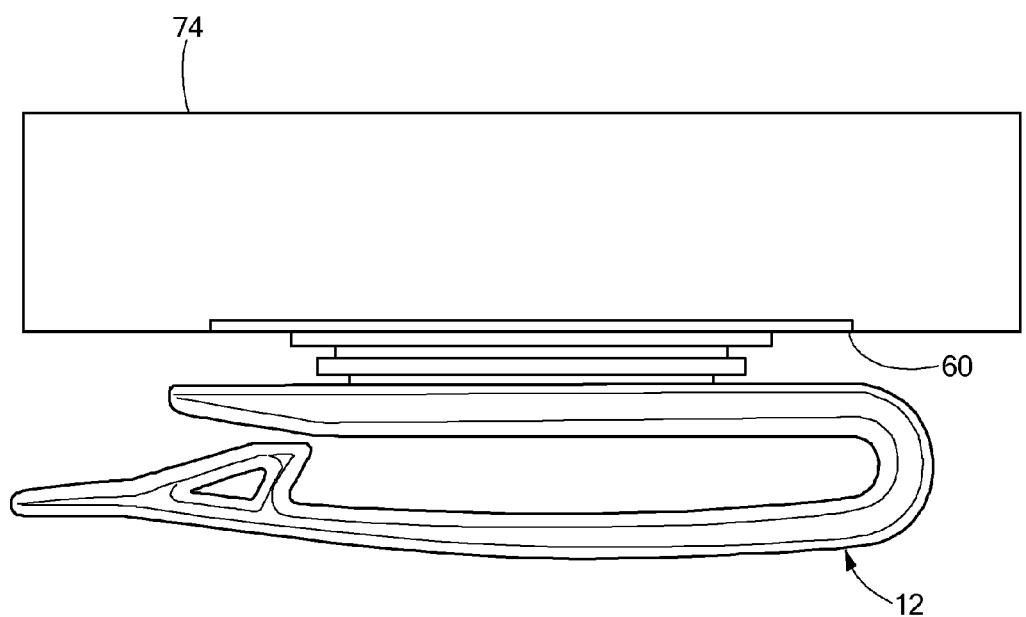
FIG. 6 is a perspective of the exchangeable mobile device mounting system shown in FIG. 1 affixed to a mobile device case.

Referring again to FIG. 1, the system 10 may further include a base plate 60 slideably engageable with the lock engagement element 32. The base plate 60 may be substantially rectangular in shape, or any shape, and may be engageable to a mobile device, mp3 player, smart phone, and the like. In an exemplary embodiment the base plate 60 is riveted or molded to a mobile device as shown in FIG. 5. The base plate 60 may further define an opening 62 at its mid section. The opening 62 may be sized to accommodate the lock engagement element 32 and to facilitate movement of the base plate 60 about the lock engagement element 32. Optionally, a similarly sized opening may also be defined by a mobile device case 74, as shown in FIG. 6, to allow access to the lock engagement element 32 when the base plate 60 is affixed to a mobile device case. A plurality of flaps 64 are also included on the base plate 60, the flaps 64 are spaced apart from each other along the interior of the opening 62 and extend from the intersection of the opening 62 and the base plate 60 towards the interior of the opening 62. The flaps 64 may be substantially tapered, such that the portion of the flaps 64 at the intersection of the opening 62 and the base plate 60 is wider than the portion of the flaps 64 that extends towards the interior of the opening. For example, as shown in FIG. 1, the base plate 60 defines two pairs of flaps 64 on opposite sides of the opening 62, each flap 64 being substantially pyramidal in shape.

The lock engagement element 32 further defines a pair of indentations 66 and 66' (collectively indentations 66) defined on opposite sides of the lock engagement element 32. The indentations 66 span the length of the lock engagement element 32 and are each sized to slideably receive the flaps 64. The lock engagement element 32 may further define a pair of grooves 68 and 68' (collectively grooves 68) defined on opposite sides of the lock engagement element 32. The grooves 68 are operable to engage the base plate 60 to the lock engagement element 32 and to lock the base plate 60 in a plurality of positions about the lock engagement element 32.

Figure 3:
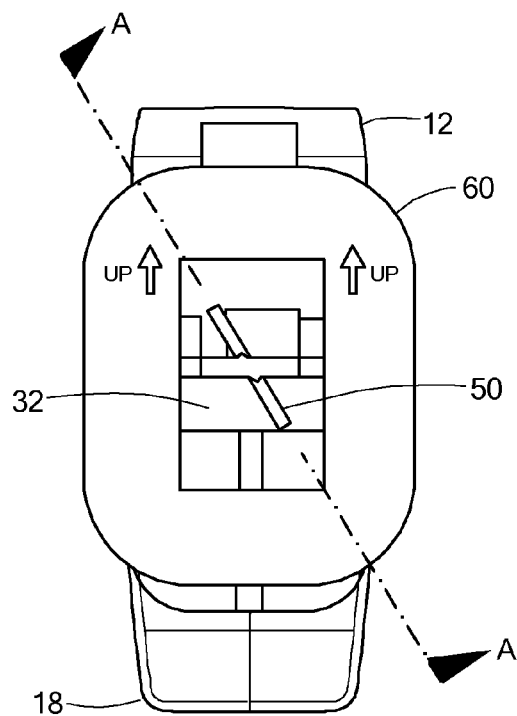
FIG. 3 is a top view of the exchangeable mobile device mounting system shown in FIG. 1.
Figure 4:
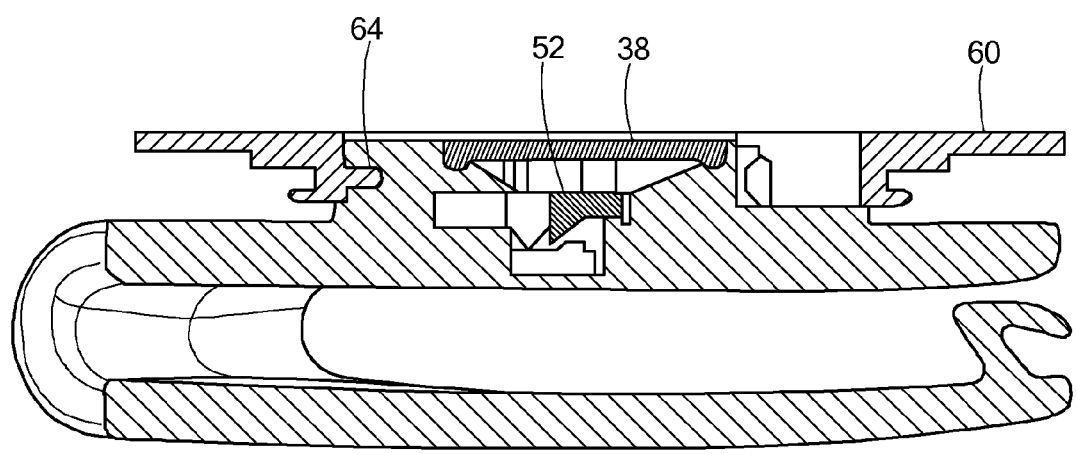
FIG. 4 is a side cross-sectional view of the embodiment shown in FIG. 3 along section A-A.

In an exemplary embodiment, the flaps 64 of base plate 60 are sized to fit within the grooves 68. For example, at least one pair of diametrically opposed flaps 64 is sized to fit within the corresponding grooves 68 on the sides of the lock engagement element 32. The flaps 60 may then slideably engage the indentations 66 to facilitate movement of the base plate 60 about the lock engagement element 32. In such an embodiment, as shown in FIGS. 3 and 4, the base plate 60 and the lock engagement element 32 may be substantially coplanar with respect to each other, which may provide a flush contact surface with a mobile device.

In an exemplary operation of the system 10, the lock 38 is pressed within the lock assembly receptacle 36. The release tab 52 may then be slideably inserted within the lock engagement element 32 to secure the lock 38 to the lock engagement element 32. In an exemplary embodiment, when the lock 38 is locked to the release tab 52 within the lock engagement element 32, both the lock 38 or the release tab 52 are retainably secured within the lock engagement element 32. The base plate 60 may then be affixed to the lock engagement element 32 by pressing the flaps 64 into the grooves 68. The pressure applied to the flaps 64 as they are pressed into the grooves 68 causes the flared edges 46 of the lock 38, which extend into the indentations 66, to be flexibly depressed within the lock assembly receptacle 36. Once the flared edges 46 are depressed, the flaps 64 may slide along the indentations 66 either in the direction towards the tab 18 or away from it, depending on the orientation of the base plate 60 when it is engaged to the lock engagement element 32.

For example, in the embodiment shown in FIG. 1, when the flaps 64 engage the grooves 68, the base plate 60 is slidable toward the tab 18 by an application of force. As the base plate 60 slides toward the tab 18, the pressure applied by the flaps 64 on the flared edges 46 is removed, and the flared edges 46 return to their biased state within the lock assembly receptacle 36, partially blocking the path defined by the indentations 66. This biased state may be caused, in part, by the second section 50 of the lock 38, which may partially raise the first section 40 of the lock 38 within the lock assembly receptacle 36. For example, when the first section 40 is depressed, the second section 50 bends and may define a substantially arcuate shape. This arcuate shape may operate to store potential energy that raises both the first section 40 and second section 50. When the depression force is removed, the potential energy stored by the second section 50 may be converted to kinetic energy. When the flared edges 46 of the first section 40 are raised, this prevents further movement of the base plate 60 along the indentations 66 and locks the base plate 60 to the lock engagement element 32.

Continuing to refer to FIG. 1, to detach the base plate 60 from the lock engagement element 32, the first section 40 of the lock 38 may be depressed within the lock assembly receptacle 36 by pushing on the first part 54 of the release tab 52, which pushes the release tab 52 towards the center of the lock assembly receptacle 36. The first part 54 may be accessible via the channel 20 when the base plate 60 is attached. Pushing the release tab 52 within the lock assembly receptacle 36 forces the first section 40 of the lock assembly receptacle 36 to depress. Depression of the first section 40 within the lock assembly receptacle 36 causes the flared edges 46 to be depressed within the lock assembly receptacle 36, which removes the partial blockage in the indentations 66 caused by the flared edges 46. As the first section 40 is depressed, the base plate 60 may slide away from the tab 18 along the indentations 66. When the flaps 64 are fully disposed within the space defined by the grooves 68, a pulling force applied to the base plate 60 causes it to be removed from the lock engagement element 32.

It is further contemplated that the base plate 60 may be attached to the lock engagement element 32 in the opposite position that shown in FIG. 1, such that to lock the base plate 60 to the lock engagement element 32 the base plate 60 is slid away from the tab 18 and to detach the base plate 60 it is slid towards the tab 18. This provides a wide range of attachment possibilities depending on the user's preferences.

Now referring to FIG. 5, in another embodiment, the system 10 may include a swivel post 70 as the clip arm attachment 12 affixed to the lock engagement element 32. The swivel post 70, which may be substantially circular in shape, may be connected to a complementary component on a mobile device case, mp3 player, smart phone, fastener, and the like, to allow rotation of, for example, the mobile device. For example, the swivel post 70 may define a plurality of catches 72 along its perimeter that may engage a plurality of projections (not shown) that allow the securable rotation of the mobile device case about the swivel post 70.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An attachment assembly for a mobile device case, the attachment assembly comprising:
   a lock engagement element;
   a lock assembly defining a pair of indentations on opposite sides of the lock engagement element, the lock assembly retainably insertable within the lock engagement element;
   a base removeably couplable from the lock assembly and having an opening there through, the base being mountable to the mobile device case, the base including a pair of flaps slideably and releasablgeable to the pair of indentations, the lock engagement element and the lock assembly cooperate to slideably and releasably affix the lock engagement element to the base within the opening; and
   the base and the lock engagement element being substantially coplanar with respect to each other when the base is engaged to the lock engagement element.

2. The attachment assembly according to claim 1, wherein the lock assembly includes a pair of flared edges extending into the pair of indentations, the pair of flared edges restricting the slidability of the pair of flaps when the pair of flaps is engaged to the pair of indentations.

3. An attachment assembly for a mobile device case, the attachment assembly comprising:

a lock engagement element, the lock engagement element defining a pair of indentations on opposite sides of the lock engagement element and a pair of grooves on opposite sides of the lock engagement element;

a lock assembly retainably insertable within the lock engagement element, the lock assembly including a pair of flared edges extending into the pair of indentations;

a base having an opening there through, the base including a pair of flaps, the flaps being slideably and releasably engageable to the pair of indentations, each groove being sized to receive a corresponding flap, the pair of flared edges restricting the slidability of the pair of flaps when the pair of flaps is engaged to the pair of indentations, the base being mountable to the mobile device case, the lock engagement element and the lock assembly cooperate to slideably and releasably affix the lock engagement element to the base within the opening; and the base and the lock engagement element being substantially coplanar with respect to each other when the base is engaged to the lock engagement element.

4. The attachment assembly according to claim 3, wherein the flared edges extend into the pair of grooves, and wherein pushing the pair of flaps within the pair of grooves depresses the flared edges into the lock engagement element.

5. The attachment assembly according to claim 1, wherein the lock assembly includes a lock configured to removably couple the base to the lock engagement assembly.

6. The attachment assembly according to claim 5, wherein the lock assembly includes a release tab receivable within a portion of the lock.

7. The attachment assembly according to claim 6, wherein moving the release tab toward the center of the lock engagement element depresses the lock within the lock engagement element.

8. The attachment assembly according to claim 7, wherein moving the release tab toward the center of the lock engagement element enables the releasability of the base from the lock engagement element.

9. The attachment assembly according to claim 1, further comprising a fastener affixed to the lock engagement element.

10. An attachment assembly for a mobile device case, the attachment assembly comprising:

a lock engagement element;

a pair of indentations defined by the lock engagement element, the pair of indentations being defined on opposite sides of the lock engagement element;

a lock assembly depressably insertable within the lock engagement element;

a base removeably couplable from the lock assembly and having an opening there through, the base being mountable to the mobile device case;

a pair of flaps included on the base and extending toward the center of the opening, the flaps being slideably engageable to the pair of indentations; and the lock assembly and the lock engagement element cooperate to slideably and retainably affix the base to the lock engagement element by securing the flaps within the indentations.

* * * * *

UNITED STATES PATENT AND TRADEMARK OFFICE
CERTIFICATE OF CORRECTION

PATENT NO.         : 8,733,603 B2                                    Page 1 of 1
APPLICATION NO.    : 12/985535
DATED              : May 27, 2014
INVENTOR(S)        : Fernando J. Tages It is certified that error appears in the above-identified patent and that said Letters Patent is hereby corrected as shown below:

In the Claims:

Column 6, line 53, Claim 1, replace "releasablgeable" with --releasably engageable--.

Signed and Sealed this
Fourteenth Day of October, 2014

Michelle K. Lee
*Deputy Director of the United States Patent and Trademark Office*